US009769647B2

(12) United States Patent
Waldner et al.

(10) Patent No.: US 9,769,647 B2
(45) Date of Patent: Sep. 19, 2017

(54) MANAGING REMOTE PROVISIONING AT A WIRELESS DEVICE

(71) Applicant: General Motors LLC, Detroit, MI (US)

(72) Inventors: Matthew R. Waldner, Grosse Pointe, MI (US); Kyle M. Ellard, Farmington Hills, MI (US); Monika Todorovic, Shelby Township, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/049,281

(22) Filed: Feb. 22, 2016

(65) Prior Publication Data

US 2017/0245138 A1 Aug. 24, 2017

(51) Int. Cl.
| | |
|---|---|
| H04W 8/20 | (2009.01) |
| H04W 8/26 | (2009.01) |
| H04W 4/00 | (2009.01) |
| G07C 5/00 | (2006.01) |

(52) U.S. Cl.
CPC ............ *H04W 8/205* (2013.01); *G07C 5/008* (2013.01); *H04W 4/001* (2013.01); *H04W 4/008* (2013.01); *H04W 8/26* (2013.01)

(58) Field of Classification Search
CPC ....... H04W 8/205; H04W 4/001; H04W 8/26; H04W 4/008; H04W 4/12; H04W 12/00; G07C 5/008; H04L 41/0886; H04L 41/0866; H04L 41/0816; H04L 63/0272; H04L 67/34; H04L 67/12; H04L 51/18; G06F 15/177; G06Q 40/12

USPC ................. 455/419, 67.12, 456.1; 725/105
See application file for complete search history.

(56) References Cited

U.S. PATENT DOCUMENTS

| | | | |
|---|---|---|---|
| 7,236,783 B2 * | 6/2007 | Gould ..................... | H04L 67/12 455/418 |
| 8,407,776 B2 * | 3/2013 | Somani ............... | H04L 63/0884 709/226 |
| 8,560,609 B2 * | 10/2013 | Nathanson ............. | G07C 5/008 370/341 |
| 8,782,720 B2 * | 7/2014 | Choi ..................... | H04N 7/147 725/87 |
| 2004/0010569 A1 * | 1/2004 | Thomas .............. | H04L 41/0806 709/220 |
| 2005/0027438 A1 | 2/2005 | Rockett et al. | |
| 2005/0164680 A1 * | 7/2005 | Gould ..................... | H04L 67/12 455/412.1 |
| 2005/0288827 A1 * | 12/2005 | Watkins ................. | G01C 21/26 701/1 |

(Continued)

*Primary Examiner* — Mahendra Patel
(74) *Attorney, Agent, or Firm* — Christopher DeVries; Reising Ethington P.C.

(57) ABSTRACT

A system and method of provisioning a wireless device that uses cellular communication protocols. The method carried out by the system includes: establishing a wireless communications session with the wireless device at a remote facility; transmitting provisioning information from the remote facility to the wireless device via the wireless communications session; and including a computer readable instruction with the provisioning information commanding the wireless device to contact the remote facility when the wireless communications session has been interrupted and the transmission of provisioning information is not complete.

13 Claims, 2 Drawing Sheets

(56) References Cited

U.S. PATENT DOCUMENTS

| | | | |
|---|---|---|---|
| 2006/0094473 A1* | 5/2006 | Stark | H04M 3/38 455/569.2 |
| 2007/0244628 A1* | 10/2007 | Rockett | G08G 1/205 701/117 |
| 2011/0234427 A1* | 9/2011 | Ingram | G08G 1/20 340/995.1 |
| 2012/0150701 A1* | 6/2012 | Leyerle | G06Q 40/12 705/30 |
| 2013/0090782 A1* | 4/2013 | Yi | H04L 69/22 701/2 |
| 2013/0226369 A1* | 8/2013 | Yorio | G06F 17/00 701/1 |
| 2014/0032045 A1* | 1/2014 | Smirnov | H04L 67/12 701/36 |

* cited by examiner

MANAGING REMOTE PROVISIONING AT A WIRELESS DEVICE

TECHNICAL FIELD

The present invention relates to wireless devices and, more specifically, to remotely provisioning wireless devices with information the devices use to communicate over a wireless carrier system.

BACKGROUND

Wireless devices use cellular communication capabilities provided by a wireless carrier system to carry out wireless communications. Before or as part of using cellular communication capabilities, the wireless devices are provisioned with content and configured with particular settings that place the wireless devices in a condition such that the devices can receive/send calls or are otherwise recognized by the wireless carrier system.

Often, this provisioning is carried out from a remote facility that initiates contact with the wireless device via the wireless carrier system and then wirelessly provides information used by the wireless device to configure itself for communications using the home wireless carrier system. Remote provisioning is sometimes interrupted before the remote facility can wirelessly provide all of the needed configuration information. In that event, the remote facility attempts to re-establish its wireless connection to the wireless device in order to complete provisioning. However, the remote facility may be unable to re-establish the wireless connection. When remote provisioning has not been completed, the remote facility may continuously attempt to contact the wireless device regardless of how successful it is at doing so. That is, even though the remote facility repeatedly contacts the wireless device without success, the remote facility will continue to do so in order to complete provisioning. These repeated attempts can consume precious computing resources and increase the airtime costs of using the wireless carrier system.

SUMMARY

According to an embodiment of the invention, there is provided a method of provisioning a wireless device that uses cellular communication protocols. The method includes establishing a wireless communications session with the wireless device at a remote facility; transmitting provisioning information from the remote facility to the wireless device via the wireless communications session; and including a computer readable instruction with the provisioning information commanding the wireless device to contact the remote facility when the wireless communications session has been interrupted and the transmission of provisioning information is incomplete.

According to another embodiment of the invention, there is provided a method of provisioning a wireless device that uses cellular communication protocols. The method includes establishing a wireless communications session with a remote facility at the wireless device; receiving provisioning information at the wireless device from the remote facility, wherein the provisioning information includes a computer readable instruction that places the wireless device in a provisioning mode causing the wireless device to initiate contact with the remote facility when the wireless communications session is interrupted and the provisioning information has not been fully received; and contacting the remote facility from the wireless device to complete provisioning while the wireless device is in the provisioning mode.

According to yet another embodiment of the invention, there is provided a method of provisioning a wireless device that uses cellular communication protocols. The method includes establishing a wireless communications session between a remote facility and the wireless device; transmitting provisioning information between the remote facility and the wireless device via the wireless communications session, wherein the provisioning information includes a computer readable instruction that places the wireless device in a provisioning mode; monitoring the wireless communications session for interruption at the wireless device in response to being placed into the provisioning mode; detecting at the wireless device that the wireless communications session has been interrupted before the receipt of provisioning information is complete while the wireless device is in the provisioning mode; determining whether one or more conditions exist at the wireless device that prevent re-establishing the wireless communications session; delaying re-establishing the wireless communications session to receive the remaining provisioning information when a condition is determined to exist that prevents re-establishing the wireless communications session while in the provisioning mode; and attempting to re-establish the wireless communications session with the remote facility at the wireless device to receive the remaining provisioning information when no condition is determined to prevent re-establishing the wireless communications session while in the provisioning mode.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below manages the provisioning of wireless devices when a wireless communications link or session between a remote facility and a wireless device is interrupted. At the start of provisioning the wireless device, the remote facility can include an instruction that activates a provisioning mode at the wireless device. While the provisioning mode is active or set, the wireless device can monitor for failure in the wireless communications session. When the wireless device detects both that the provisioning mode is active and the wireless communications session has failed, it can determine an appropriate time to initiate a new wireless communications session with the remote facility to resume provisioning.

Rather than tasking the remote facility to re-establish failed wireless communications sessions with one or more wireless devices for continued provisioning, the provisioning mode at each wireless device can shift the burden of determining an appropriate time for re-establishing wireless communications links to the wireless devices. This is advantageous because the wireless device is more likely to know the reason why the wireless communication session failed than the remote facility. For example, the wireless device may be in an area where the strength of the wireless signal from nearby cell tower is weak or the wireless device has been placed in a quiescent mode with its radio frequency (RF) communications capabilities are temporarily turned off. The wireless device can identify these conditions and then delay re-establishing the wireless communication session until conditions are more favorable. In contrast, systems in which the remote facility determines when to re-establish a wireless communication link may continuously retry from the remote facility despite the wireless device not being in a condition for successful provisioning. It would be helpful to complete interrupted remote provisioning without repeated attempts to contact the wireless device from the remote facility.

The implementations that follow describe the wireless device in terms of a vehicle telematics unit. But it should be appreciated that other types of wireless devices that use cellular communication protocols can be used with the system and method described herein in lieu of the vehicle telematics unit. For example, wireless devices can also be implemented as cellular phones or "smart phones."

Communications System—

Figure 1:
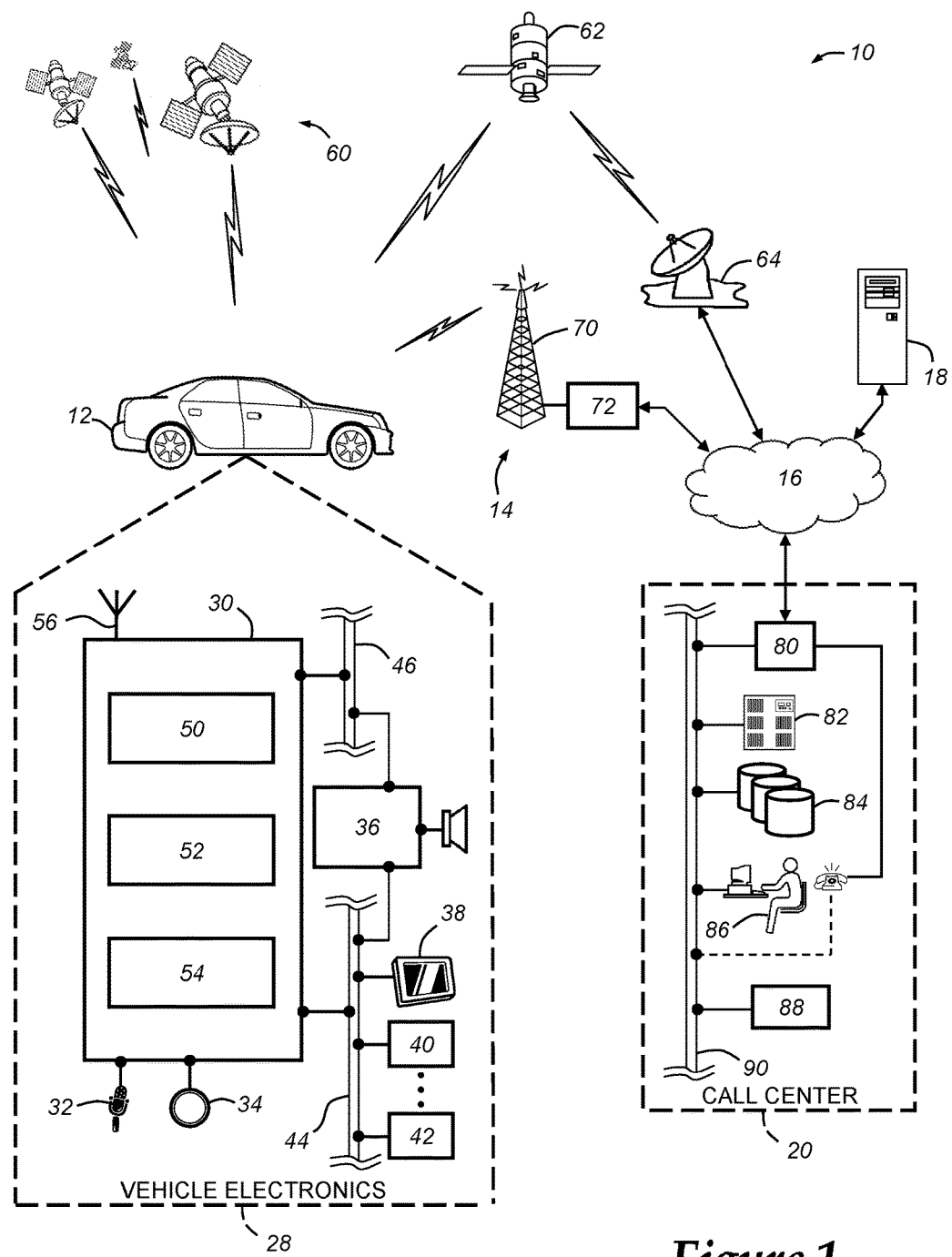
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™ Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
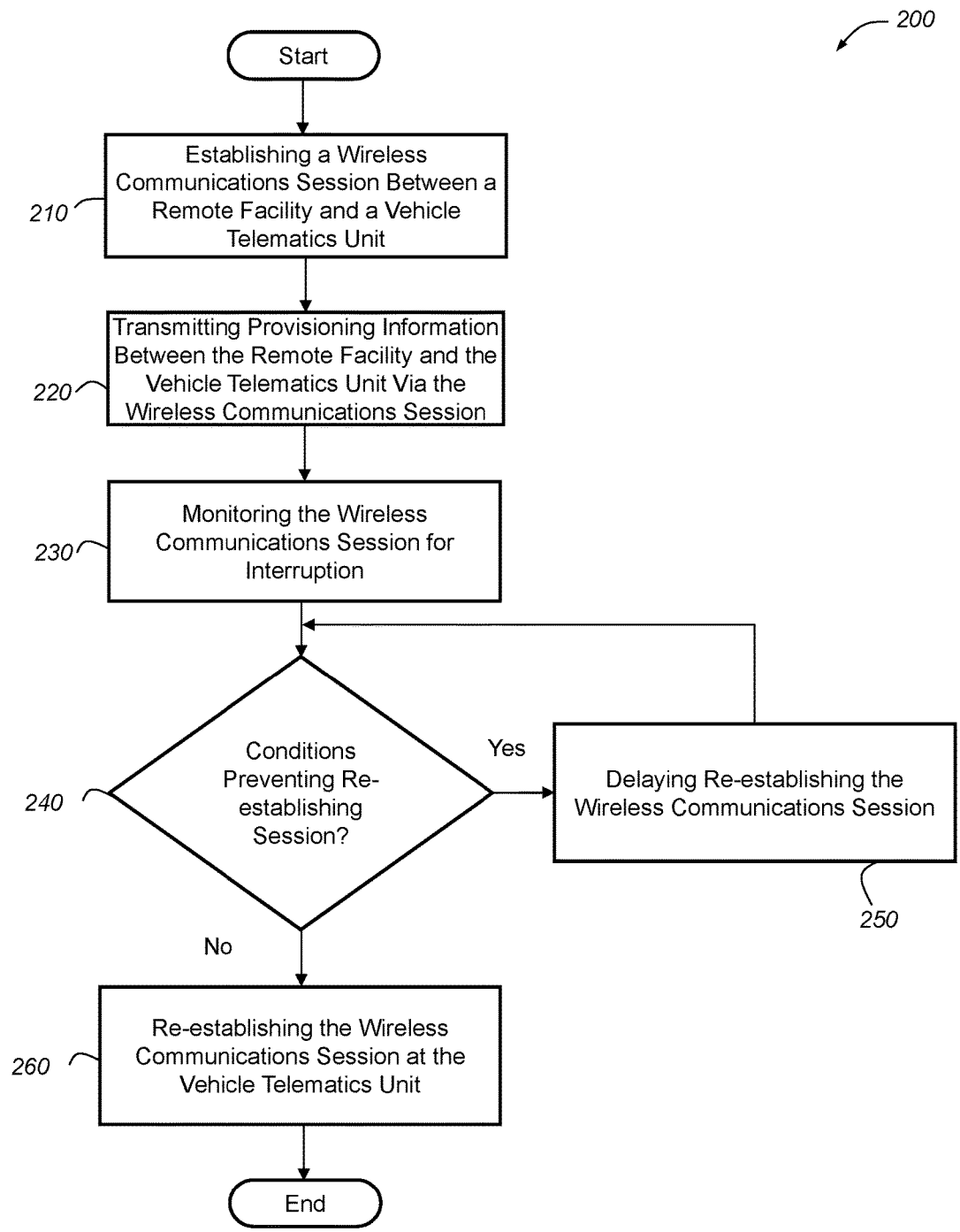
FIG. 2 is a flow chart depicting an embodiment of a method of provisioning wireless devices.

Turning now to FIG. 2, there is shown an embodiment of a method 200 of provisioning a vehicle telematics unit 30 that uses cellular communication protocols. The method 200 begins at step 210 by establishing a wireless communications session between a remote facility and the vehicle telematics unit 30. Provisioning, as it is used herein, refers to providing information to the wireless device (in this embodiment, the vehicle telematics unit 30) as part of setting up new cellular service with the wireless carrier system 14 or modifying information previously provided and used for cellular service with the wireless carrier system 14. Even though the vehicle telematics unit 30 may not be provisioned, it still may include information stored at the cellular chipset that allows it to make calls to a limited number of recipients or for a limited purpose, such as to a remote facility for provisioning. For example, the vehicle telematics unit 30 can be provisioned with 500 MIN numbers that allow this sort of limited purpose calling.

The information provided as part of provisioning includes data that configures hardware and software of the vehicle telematics unit 30 so that it, at a minimum, provides cellular communications using a cellular protocol via the wireless carrier system 14. The information exchanged between the remote facility and the vehicle telematics unit 30 as part of provisioning includes the wireless carrier system 14 or remote facility receiving an international mobile subscriber identity (IMSI) from the vehicle telematics unit 30 such that it can be associated with a mobile dialed number (MDN) used with the unit 30. Provisioning information can also include data files with a preferred roaming list (PRL) that identifies other wireless carrier systems with which the home wireless carrier system 14 has economic agreements with to provide cellular service when the home wireless carrier system 14 is unavailable. In addition, the provisioning information can include settings for routing the short message service (SMS) messages or for routing email and other IP packet data, such as IMAP or SMTP settings. The remote facility from which the vehicle telematics unit 30 receives provisioning information can be implemented in different ways, such as by the computer 18 providing back office data management services or the call center 20.

The wireless communications session can be established when the vehicle 12 is initially sold to a vehicle owner and the vehicle telematics unit 30 requires initial provisioning. However, even after the vehicle telematics unit 30 has been initially provisioned, sometimes the unit 30 may be re-provisioned with different information, such as a different MDN or wireless carrier system 14. The present method 200 can also be used to handle provisioning after the vehicle telematics unit 30 has been initially provisioned. In one embodiment, the remote facility can decide to initiate and establish the wireless communications session to transmit provisioning information to the vehicle telematics unit 30. Or, in another embodiment, the vehicle telematics unit 30 can initiate the wireless communications session and request provisioning information from the remote facility. For example, after purchasing the vehicle 12 or changing the wireless carrier system providing cellular service, a vehicle owner can initiate provisioning of the vehicle telematics unit 30 at the vehicle 12 by pressing the button 34. Or the vehicle 12 can periodically initiate the wireless communications session to determine if updated information is available from the remote facility, such as an updated PRL. The wireless communications session can be carried via the wireless carrier system 14 using cellular protocols. Alternatively, it can be implemented using other wireless communication techniques, such as by communicating provisioning information via short-range wireless communication protocols (e.g., Wi-Fi) using packetized data. For example, the telematics unit may connect via Wi-Fi to a local access point at a dealership or the owner's residence and communicate with the remote facility via land network 16 (e.g., over the Internet). The method 200 proceeds to step 220.

At step 220, provisioning information is transmitted between the remote facility and the vehicle telematics unit 30 via the wireless communications session. The provisioning information includes a computer readable instruction that places the wireless device in a provisioning mode. In addition to the information used for provisioning the vehicle telematics unit 30 with the wireless carrier system 14, the computer readable instruction can place the unit 30 in a provisioning mode that becomes active once receipt of provisioning information at the unit 30 has begun and remain active until reception of the information is complete. The computer readable instruction can be executed by the processor 52 of the vehicle telematics unit 30 causing a flag or trigger to be set until all of the provisioning information has been successfully received.

The provisioning information can be transmitted as an ordered list of data packets. If transmission is interrupted at any point it can be resumed without re-transmitting data. When provisioning begins, the number of data packets included in the provisioning information can be communicated initially so that the vehicle telematics unit 30 can determine when reception of the provisioning information is complete. For example, if the provisioning information includes 100 data segments or packets and the wireless communications session is interrupted after the vehicle telematics unit 30 receives the fiftieth data segment, after re-establishing the wireless communications session, the remote facility can then transmit the fifty-first data segment rather than restarting transmission of the provisioning information by transmitting the first data segment. The method 200 proceeds to step 230.

At step 230, the wireless communications session is monitored for interruption at the vehicle telematics unit 30 in response to being placed into the provisioning mode and the vehicle telematics unit 30 detects that the wireless communications session has been interrupted before the receipt of provisioning information is complete. While in provisioning mode and receiving provisioning information, the vehicle telematics unit 30 can determine whether progress receiving the provisioning information has stopped or if it has slowed below a threshold. For example, the processor 52 of the vehicle telematics unit 30 can monitor a variety of variables to determine whether or not the wireless communications session has been interrupted. The processor 52 can determine whether a predefined period of time has passed since the last data packet has been received. In one implementation, this threshold can be set at one minute, but other thresholds are possible. It is also possible for the processor 52 to detect that the strength of the signal used to establish a cellular call or a short-range wireless signal is below a threshold that would support a call or connection. The method 200 proceeds to step 240.

At step 240, the vehicle telematics unit 30 determines whether one or more conditions exist that prevent re-establishing the wireless communications session. Once the wireless communications session is lost or has been interrupted, the vehicle telematics unit 30 can decide when to re-establish a new wireless communications session with the remote facility. When a condition is determined to exist that prevents re-establishing the wireless communications session while in the provisioning mode, the method 200 proceeds to step 250 and the vehicle telematics unit 30 delays re-establishing the wireless communications session to receive the remaining provisioning information. Otherwise, the method 200 proceeds to step 260 and the vehicle telematics unit 30 attempts to re-establish the wireless communications session with the remote facility at the vehicle telematics unit 30 to receive the remaining provisioning information when no condition is determined to prevent re-establishing the wireless communications session while in the provisioning mode.

A variety of conditions—alone or in combination—can be established for determining whether it is an appropriate time to re-establish a wireless communication session. These conditions can include the strength of wireless signals detected by the vehicle telematics unit 30 that are available for use to establish a cellular call to the remote facility. Another condition may be the level of battery charge at the vehicle 12 (or battery used by the wireless device). Each of these conditions can be associated with a condition threshold that is used to control whether or not the vehicle telematics unit 30 re-establishes the wireless communications session. The vehicle telematics unit 30 can also determine whether or not the vehicle ignition switch is in the "on" position as a condition of whether or not the vehicle telematics unit 30 re-establishes the wireless communications session. And another condition can include determining the time and day of week with temporal windows and re-establishing the wireless communications session only when the air time cost of doing so is lower than at other times of the day.

Before re-establishing the wireless communications session, the vehicle telematics unit 30 can determine whether it is in the provisioning mode and whether it is waiting to receive additional provisioning information. If the vehicle telematics unit 30 determines that it is in the provisioning mode and it is waiting for additional provisioning information, then the vehicle telematics unit 30 can determine whether one or more of conditions exist. If one or more of the conditions exist, then the vehicle telematics unit 30 can delay re-establishing the wireless communications session for a determined amount of time, for example one hour or one day. After the determined amount of time has passed, the vehicle telematics unit 30 can again check to see if it is in the provisioning mode and if one or more of the conditions exist. If the vehicle telematics unit 30 is still in the provisioning mode and no condition exists, then the vehicle telematics unit 30 can initiate a wireless communications session with the remote facility. When re-establishing the communications session is successful, the vehicle telematics unit 30 can begin receiving the remainder of provisioning information not received before the initial or original wireless communications session is interrupted. After receiving all of the provisioning information, the vehicle telematics unit 30 can reset the flag or trigger that placed it into provisioning mode. Or in another implementation, the vehicle telematics unit 30 can wirelessly transmit confirmation to the remote facility that all of the provisioning information has been received. The remote facility can respond by wirelessly sending a computer-readable instruction to the vehicle telematics unit 30 instructing it to clear the flag or trigger placing it in provisioning mode. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of provisioning a wireless vehicle telematics device that uses cellular communication protocols, comprising the steps of:
    (a) establishing a wireless communications session with a remote facility at the wireless device;
    (b) receiving provisioning information at the wireless device from the remote facility, wherein the provisioning information includes a computer readable instruction that places the wireless device in a provisioning mode causing the wireless device to initiate contact with the remote facility when the wireless communications session is interrupted and the provisioning information has not been fully received;
    (c) monitoring the wireless communications session for interruption at the wireless device using the wireless device in response to being placed into the provisioning mode;
    (d) detecting at the wireless device that the wireless communications session has been interrupted before the receipt of provisioning information is complete while the wireless device is in the provisioning mode;
    (e) detecting that one or more conditions exist at the wireless device preventing re-establishing the wireless communications session and delaying re-establishing the wireless communications session until the conditions are no longer present;
    (f) re-establishing the wireless communications session with the remote facility at the wireless device to receive the remaining provisioning information while in the provisioning mode; and
    (g) resuming provisioning over the re-established wireless communication session with the remote facility.

2. The method of claim 1, wherein the conditions further comprise a wireless signal strength, a time of day, or a battery charge level.

3. The method of claim 1, wherein the wireless device further comprises a vehicle telematics unit.

4. The method of claim 3, wherein the conditions further comprise a wireless signal strength, a time of day, a battery charge level, or a vehicle ignition switch position.

5. The method of claim 1, wherein the wireless communications session is established according to a cellular communications protocol.

6. The method of claim 1, wherein the wireless communications session is established according to a short-range wireless communications protocol.

7. The method of claim 1, further comprising the step of transmitting an international module subscriber identity (IMSI) from the wireless device.

8. A method of provisioning a wireless vehicle telematics device that uses cellular communication protocols, comprising the steps of:
    (a) establishing a wireless communications session between a remote facility and the wireless device;
    (b) receiving provisioning information from the remote facility at the wireless device via the wireless communications session, wherein the provisioning information includes a computer readable instruction that places the wireless device in a provisioning mode;
    (c) monitoring the wireless communications session for interruption at the wireless device using the wireless device in response to being placed into the provisioning mode;
    (d) detecting at the wireless device that the wireless communications session has been interrupted before the receipt of provisioning information is complete while the wireless device is in the provisioning mode;
    (e) determining whether one or more conditions exist at the wireless device that prevent re-establishing the wireless communications session;
    (f) delaying re-establishing the wireless communications session to receive the remaining provisioning information when a condition is determined to exist that prevents re-establishing the wireless communications session while in the provisioning mode; and
    (g) attempting to re-establish the wireless communications session with the remote facility at the wireless device to receive the remaining provisioning information when no condition is determined to prevent re-establishing the wireless communications session while in the provisioning mode.

9. The method of claim 8, wherein the conditions further comprise a wireless signal strength, a time of day, or a battery charge level.

10. The method of claim 8, wherein the wireless device further comprises a vehicle telematics unit.

11. The method of claim 10, wherein the conditions further comprise a wireless signal strength, a time of day, a battery charge level, or a vehicle ignition switch position.

12. The method of claim 8, wherein the wireless communications session is established according to a cellular communications protocol.

13. The method of claim 8, wherein the wireless communications session is established according to a short-range wireless communications protocol.

* * * * *